United States Patent Office
3,427,386
Patented Feb. 11, 1969

3,427,386
3-METHYLENE-ANDROSTAN-17β-OLS AND 17-ALKYL DERIVATIVES THEREOF
Albert Bowers, John Edwards, and James C. Orr, Mexico City, Mexico, assignors, by mesne assignments, to Syntex Corporation, a corporation of Panama
No Drawing. Filed Jan. 3, 1962, Ser. No. 164,185
Claims priority, application Mexico, June 1, 1961, 62,924
U.S. Cl. 424—238         17 Claims
Int. Cl. C07c 169/24; A61k 17/06

The present invention relates to certain new cyclopentanoperhydrophenanthrene derivatives and to a method for the preparation thereof.

More particularly, it relates to the novel esters of 3-methyleneandrostan-17β-ol and 3-methylene-Δ⁴-androsten-17β-ol, their 17α-alkyl substituted derivatives as well as the corresponding 19-nor derivatives.

The novel compounds object of our invention are represented by the following formulas:

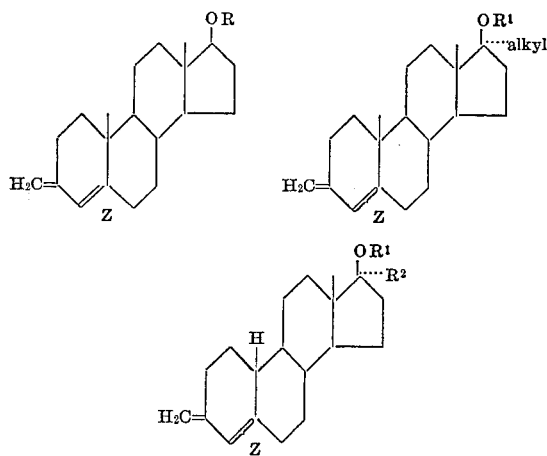

In the above formulas R represents an acyl radical; R¹ represents hydrogen or acyl; R² represents hydrogen or a lower alkyl group such as methyl, ethyl, propyl or butyl. and Z represents a single or double bond between C–4 and C–5; in the saturated compounds the hydrogen atom at C–5 is in the α-configuration.

The acyl groups referred to above derive from carboxylic acids of 1 to 12 carbon atoms, saturated or unsaturated, of straight, branched, cyclic, aromatic or mixed aliphatic-cyclic chain, which may be further substituted with functional groups such as hydroxyl, alkoxy, nitro, amino or halogen. Typical such esters are the acetate, propionate, caproate, enanthate, undecenoate, benzoate, trimethylacetate, t-butylacetate, phenoxyacetate, cyclopentylpropionate, aminoacetate and β-chloropropionate.

The preparation of 3-methylene-androstan-17β-ol and 3-methylene Δ⁴-androsten-17β-ol from the corresponding 3-ketones has been previously reported by F. Sondheimer et al. in J. A. Chem. Soc. 79, 5029 (1957). However, the biological activity of these compounds has not been determined.

The surprising discovery has been made that these compounds are powerful anabolic agents having a minimum of androgenic activity; furthermore, they possess antiluteinizing activity and antiestrogenic activity, lower the cholesterol level in the blood and inhibit the excretion of gonadotropins by the pituitary gland.

The anabolic-androgenic activity of these compounds has been evaluated, for example, in male castrated young rats administering the compound by injection and measuring the response to such treatment by the increase in weight of the ventral prostate, seminal vesicles and the anus levatory muscle. The results of these tests indicate that these compounds possess a very low androgenic activity, whereas the anabolic activity is much greater than the anabolic activity of testosterone.

According to the present invention it has been found that the therapeutic doses of these compounds vary between 5 and 50 mg. daily, according with the age and pathological state of the patient. When a pharmaceutical preparation of prolonged action is desired, there may be advantageously administered a mixture of esters derived from carboxylic acids of 1 to 12 carbon atoms of different chain length, as for example a mixture of the acetate, caproate and cyclopentylpropionate of 3-methylene-Δ⁴-androsten-17β-ol. A single injection of such preparation is sufficient to produce the same action as several injections of the free compound or of a single ester administered daily for several weeks. It is worth noting that the doses required in this case are generally larger than those indicated previously.

The compounds of the present invention which do not possess an additional substituent at C–17α, are administered by injection, the 3-methylene-androstan-17β-ol, 3-methylene-Δ⁴-androsten-17β-ol and their 19-nor derivatives are microcrystalline suspensions and the esters in oil solution, preferably using sesame oil.

The 17α-alkyl substituted derivatives of 3-methylene-androstan-17β-ol, 3-methylene-Δ⁴-androsten-17β-ol, their esters and the corresponding 19-nor derivatives may be administered by the oral route in the form of capsules or tablets, or by injection in oil solution.

The esters of 3-methylene-androstan-17β-ol and 3-methylene-Δ⁴-androsten-17β-ol are obtained by treating the free compounds in pyridine solution with anhydrides or chlorides of acids of 1 to 12 carbon atoms.

The 17α-substituted compounds are obtained by the methods illustrated by the following equation:

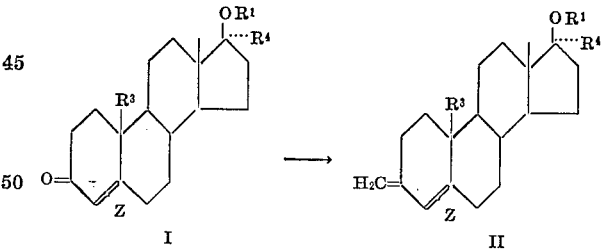

In the above formulas, R¹ and Z have the same meaning set forth previously; R³ represents hydrogen or methyl and R⁴ represents a lower alkyl group.

In practicing the process outlined above, a 17α-alkyl substituted derivative of androstan-17β-ol-3-one, Δ⁴-androsten-17β-ol-3-one or an ester thereof (I; R³=methyl), was reacted with methylene triphenylphosphine (Wittig reaction) in a solvent inert to this reaction, preferably in tetrahydrofuran at the reflux temperature, for a period of time between 6 and 12 hours. In this manner, the keto group at C–3 is replaced by a methylene radical, thus obtaining the 3-methylene-17β-alkyl derivatives of androstan-17β-ol, of Δ⁴-androsten-17β-ol or of esters thereof (II; R³=methyl). The reagent of methylenetriphenylphosphine is previously prepared by reacting methyl triphenylphosphonium bromide with butyl lithium in ether solution.

Optionally, the acyloxy group of the 3-methylene-17α-alkyl-17-acyloxy compounds may be saponified by treatment with dilute methanolic sodium or potassium hydroxide solution, at the reflux temperature for a period of time between 1 and 3 hours.

Thus, for example, by treating the acetate of 17α-methyldihydroallotestosterone with methylenetriphenylphosphine, there is obtained the acetate of 3-methylene-17α-methyl-androstan-17β-ol, which on refluxing with 0.5% methanolic potassium hydroxide for 2 hours furnished 3-methylene-17α-methyl-androstan-17β-ol.

In the same manner, by treating with methylenetriphenylphosphine a 17α-alkyl substituted derivative of 19-nor-androstan-17β-ol-3-one, of Δ⁴-19-nor-androsten-17β-ol-3-one or of an ester of the same (I; R³=hydrogen), there are obtained the corresponding 3-methylene-17α-alkyl-19-nor-androstanes and Δ⁴-19-nor-androstenes (II; R³=hydrogen).

The 3-methylene derivatives of 19-nor-androstan-17β-ol and 19-nor-Δ⁴-androsten-17β-ol are obtained by reacting 19-nor-androstan-17β-ol-3-one and 19-nor-Δ⁴-androsten-17β-ol-3-one with methylenetriphenylphosphine, as indicated previously for the 17α-substituted compounds. By reacting the 3-methylene-19-nor-compounds thus obtained, with the acid anhydrides or chlorides set forth previously, there are obtained the respective esters.

The following examples serve to illustrate but are not intended to limit the scope of the present invention:

EXAMPLE I

To a suspension of 10.7 g. of triphenylmethylphosphonium bromide prepared from methyl bromide and triphenylphosphine, in accordance with the method of G. Wittig et al. described in Ber., 87, 1318 (1954), in 200 cc. of anhydrous ether, there was added under an atmosphere of nitrogen 30 cc. of a 1 N ether solution of butyl lithium. The mixture was stirred for half an hour at room temperature and then there was slowly added a solution of 3 g. of the acetate of 17α-methyl-testosterone in 200 cc. of ether and the resulting mixture was stirred for 4 hours and then kept at room temperature overnight. There was then added 600 cc. of tetrahydrofuran and the ether was distilled (until internal temperature reached 56° C.); the mixture was refluxed for 8 hours, cooled, treated with water and the product was extracted with methylene chloride; the extract was washed with water, dilute hydrochloric acid and finally with water to neutral, dried over anhydrous sodium sulfate and evaporated to dryness. The residue was chromatographed on 150 g. of washed alumina, eluting the product with benzene. By crystallization from ether-hexane, there was obtained the acetate of 3-methylene-17α-methyl-androstan-17β-ol.

A mixture of 500 mg. of the above compound and 15 cc. of 0.5% methanolic potassium hydroxide solution was refluxed for 2 hours under an atmosphere of nitrogen and then diluted with water; the precipitate formed was collected by filtration and thus there was obtained 3-methylene-17α-methyl-androstan-17β-ol.

EXAMPLE II

In accordance with the method described in the preceding example, 2 g. of 19-nor-testosterone was treated with triphenylmethylphosphonium bromide to produce 3-methylene-Δ⁴-19-nor-androsten-17β-ol.

A mixture of 500 mg. of the above compound, 2 cc. of pyridine and 1 cc. of benzoyl chloride was kept standing at 0° C. for 18 hours and then poured into water. The precipitate formed was collected and crystallized from chloroform-methanol, thus yielding the benzoate of 3-methylene-Δ⁴-19-nor-androsten-17β-ol.

EXAMPLE III

To a solution of 5 g. of 3-methylene-androstan-17β-ol in 20 cc. of pyridine was added 10 cc. of propionic anhydride and the mixture was kept overnight at room temperature. After pouring into ice water the precipitate was collected and recrystallized from ethyl acetate, thus furnishing the propionate of 3-methylene-androstan-17β-ol.

In the same manner, but using caproic, acetic and cyclopentylpropionic anhydrides as esterifying agents, there were obtained the caproate, acetate and cyclopentylpropionate of 3-methylene-androstan-17β-ol.

EXAMPLE IV

By esterification of 3-methylene-Δ⁴-androsten-17β-ol with acetic, valeric and cyclopentylpropionic anhydrides in pyridine solution, in accordance with the method of the preceding example, there were obtained the acetate, valerate and cyclopentylpropionate of 3-methylene-Δ⁴-androsten-17β-ol.

EXAMPLE V

In accordance with the method described in Example I, the compounds set forth in Column I were treated with methylenetriphenylphosphine, thus affording the respective 3-methylene compounds (Column II).

| I | II |
|---|---|
| 19-nor-androstan-17β-ol-3-one | 3-methylene-19-nor-androstan-17β-ol. |
| 17α-propyl-Δ⁴-androsten-17β-ol-3-one | 3-methylene-17α-propyl-Δ⁴-androsten-17β-ol. |
| 17α-methyl-Δ⁴-androsten-17β-ol-3-one | 3-methylene-17α-methyl-Δ⁴-androsten-17β-ol. |
| 17α-methyl-Δ⁴-19-nor-androsten-17β-ol-3-one | 3-methylene-17α-methyl-Δ⁴-19-nor-androsten-17β-ol. |
| 17α-butyl-Δ⁴-19-nor-androsten-17β-ol-3-one | 3-methylene-17α-butyl-Δ⁴-19-nor-androsten-17β-ol. |

EXAMPLE VI

By following the method described in Example I, 10 g. of 17α-methyl-19-nor-androstan-17β-ol-3-one was subjected to the Wittig reaction, thus affording 3-methylene-17α-methyl-19-nor-androstan-17β-ol.

EXAMPLE VII

Pharmaceutical composition containing the propionate of 3-methylene-androstan-17β-ol in the form of an injectable solution.

1000 cc. injectable solution contain: Grams
Propionate of 3-methylene-androstan-17β-ol _ 25
Propyl-hydroxybenzoate (propylparaben U.S.P.) _____ 1
Benzyl alcohol _____ 104.3
Sesame oil _____ 805

Preparation.—Place the propionate of 3-methylene-androstan-17β-ol and the propylparaben, accurately weighed, in an adequate container which can be hermetically closed. Add the benzyl alcohol and the sesame oil, taking down the particles sticking to the sides of the container. Close hermetically and heat to 80–90° C. with stirring until all dissolves. Cool to 40–50° C. and filter through a Horman "EOP" ultrafilter (Selas cells of XFF porosity may also be employed). Seal with neoprene stoppers and sterilize at 125° C. in a dry heat oven for 12 hours. Under aseptic conditions transfer to adequate containers according to the required doses; finally sterilize these containers at 125° C. for 12 hours (for ampule bottles) and for 2 hours for ampules.

1 cc. of this injectable solution contains approximately 25 mg. of the propionate of 3-methylene-androstan-17β-ol.

The daily administration of 1 cc. of this solution, by intramuscular injection, produces a favorable anabolic effect.

EXAMPLE VIII

Pharmaceutical composition containing 3-methylene-Δ⁴-androsten-17β-ol in the form of an injectable suspension.

Formula for 1000 cc. of suspension:                      Grams
   3 - methylene-$\Delta^4$-androsten-17$\beta$-ol _____ 10.250
   Sodium carboxymethylcellulose _____ 5.0
   Sodium chloride _____ 9.0
   Methyl cellulose _____ 1.0
   Sorbitan mono - oleate polyoxyethylene
     (Tween 80 U.S.P.) _____ 1.9
   Methyl-p-hydroxybenzoate _____ 2.5
   Propyl p-hydroxybenzoate _____ 0.26
   Distilled water _____ 968.4

Preparation.—A solution A was obtained by dissolving the sodium chloride, methyl p-hydroxybenzoate and propyl p-hydroxybenzoate in the distilled water and sterilizing by filtration. 200 cc. of such solution was used to dissolve the methyl cellulose and sodium carboxymethylcellulose (solution B).

Solution B was transferred to a ball mill, the carefully weighed 3-methylene-$\Delta^4$-androsten-17$\beta$-ol was added and the mixture was sterilized for 1½ hours in an autoclave at 120° C.; after cooling, there was added the Tween 80. The sterile mixture thus obtained was stirred (rotary stirring) for 48 hours at room temperature and the resulting suspension was quantitatively transferred to a sterile container, diluting with the remainder of solution A (also sterile) and adjusting the pH to 6.8. Finally it was transferred to 1 cc. ampules under aseptic conditions. Each cc. of this injectable suspension contains approximately 10 mg. of 3-methylene-$\Delta^4$-androsten-17$\beta$-ol.

EXAMPLE IX

Pharmaceutical composition containing a mixture of esters of 3-methylene-androstan-17$\beta$-ol in the form of injectable oil solution.

Formula for 1000 cc. of solution:                      Grams
   Acetate of 3-methylene-androstan-17$\beta$-ol_____ 20
   Caproate of 3-methylene-androstan-17$\beta$-ol ____ 40
   Cyclopentylpropionate of 3 - methylene-androstan-17$\beta$-ol _____ 120
   Propyl-paraben U.S.P. _____ 1
   Benzyl alcohol _____ 110
   Sesame oil _____ 775

The method of preparation followed was that described in Example VII.

The administration of 1 cc. of this composition produces nitrogen retention for several weeks.

We claim:

1. A compound of the following formula:

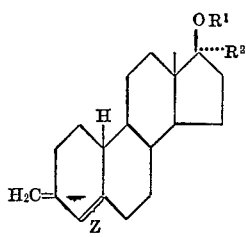

wherein Z is selected from the group consisting of a double bond and a saturated linkage between C–4 and C–5; $R^1$ is selected from the group consisting of hydrogen and a hydrocarbon carboxylic acyl group of less than 12 carbon atoms and $R^2$ is lower alkyl.

2. 3 - methylene - 17$\alpha$ - lower alkyl-19-nor-androstan-17$\beta$-ol.

3. 3-methylene-17$\alpha$-methyl-19-nor-androstan-17$\beta$-ol.
4. 3-methylene-17$\alpha$-methyl-$\Delta^4$-19-nor-androsten-17$\beta$-ol.
5. 3-methylene-17$\alpha$-butyl-$\Delta^4$-19-nor-androsten-17$\beta$-ol.
6. The hydrocarbon carboxylic acid esters of less than 12 carbon atoms of 3-methylene-17$\alpha$-lower alkyl-$\Delta^4$-19-nor-androsten-17$\beta$-ol.
7. The hydrocarbon carboxylic acid esters of less than 12 carbon atoms of 3-methylene-17$\alpha$-lower alkyl-19-nor-androstan-17$\beta$-ol.
8. A pharmaceutical composition in unit dosage form comprising the combination of 3-methylene-17$\alpha$-lower alkyl-19-nor-androstan-17$\beta$-ol and a suitable pharmaceutical carrier.
9. A pharmaceutical composition in unit dosage form comprising the combination of 3-methylene-17$\alpha$-lower alkyl-$\Delta^4$-19-nor-androsten-17$\beta$-ol and a suitable pharmaceutical carrier.
10. A pharmaceutical composition in unit dosage form comprising up to 180 mg. of the hydrocarbon carboxylic acid esters of less than 12 carbon atoms of 3-methylene-17$\alpha$-lower alkyl-19-nor-androstan-17$\beta$-ol and a suitable pharmaceutical carrier.
11. A pharmaceutical composition in unit dosage form comprising up to 180 mg. of the hydrocarbon carboxylic acid esters of less than 12 carbon atoms of 3-methylene-17$\alpha$-lower alkyl-$\Delta^4$-19-nor-androsten-17$\beta$-ol and a suitable pharmaceutical carrier.
12. The method of promoting anabolic effects comprising orally administering to an animal an effective amount of a compound selected from the group consisting of 3-methylene-17$\alpha$-lower alkyl-androstan-17$\beta$-ol, 3-methylene-$\Delta^4$-17$\alpha$-lower alkyl androsten-17$\beta$-ol, the hydrocarbon carboxylic acid esters of less than 12 carbon atoms of 3-methylene-17$\alpha$-lower alkyl androstan-17$\beta$-ol and the hydrocarbon carboxylic acid esters of less than 12 carbon atoms of 3-methylene-$\Delta^4$-17$\alpha$-lower alkyl androsten-17$\beta$-ol.
13. The method of promoting anabolic effects comprising parenterally administering to an animal an effective amount of a compound selected from the group consisting of 3-methylene-androstan-17$\beta$-ol, 3-methylene-$\Delta^4$-androsten-17$\beta$-ol, the hydrocarbon carboxylic acid esters of less than 12 carbon atoms of 3-methylene-androstan-17$\beta$-ol and the hydrocarbon carboxylic acid esters of less than 12 carbon atoms of 3-methylene-$\Delta^4$-androsten-17$\beta$-ol.
14. The method of promoting anabolic effects comprising parenterally administering to an animal an effective amount of a compound selected from the group consisting of 3-methylene-19-norandrostan-17$\beta$-ol, 3-methylene-$\Delta^4$-19-nor-androsten-17$\beta$-ol, the hydrocarbon carboxylic acid esters of less than 12 carbon atoms of 3-methylene-19-nor-androstan-17$\beta$-ol and the hydrocarbon carboxylic acid esters of less than 12 carbon atoms of 3-methylene-$\Delta^4$-19-nor-androsten-17$\beta$-ol.
15. The method of promoting anabolic effects comprising orally administering to an animal an effective amount of a compound selected from the group consisting of 3-methylene-17$\alpha$-lower alkyl-19-nor-androstan -17$\beta$-ol, 3 - methylene-17$\alpha$-lower alkyl-$\Delta^4$-19-nor-androsten-17$\beta$-ol, the hydrocarbon carboxylic acid esters of less than 12 carbon atoms of 3-methylene-17$\alpha$-lower alkyl-19-nor-androstan-17$\beta$-ol and the hydrocarbon carboxylic acid esters of less than 12 carbon atoms of 3-methylene-17$\alpha$-lower alkyl-$\Delta^4$-19-nor-androsten-17$\beta$-ol.
16. The method of promoting anabolic effects comprising parenterally administering to an animal an effective amount of a compound selected from the group consisting of 3-methylene-17$\alpha$-lower alkyl-19-nor-androstan-17$\beta$-ol, 3-methylene-17$\alpha$-lower alkyl-$\Delta^4$-19-nor-androsten-17$\beta$-ol, the hydrocarbon carboxylic acid esters of less than 12 carbon atoms of 3-methylene-17$\alpha$-lower alkyl-19-nor-androstan-17$\beta$-ol and the hydrocarbon carboxylic acid esters of less than 12 carbon atoms of 3-methylene-17$\alpha$-lower alkyl-$\Delta^4$-19-nor-androsten-17$\beta$-ol.

17. A compound of the formula:

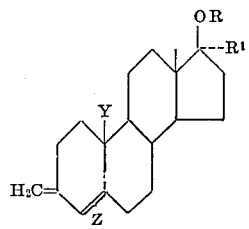

wherein Y is selected from the group consisting of hydrogen and methyl, R is selected from the group consisting of hydrogen and a lower hydrocarbon carboxylic acyl group, $R^1$ is lower alkyl and Z is selected from the group consisting of a single and double bond.

References Cited

Scondhemer et al. J.A.C.S. 79, 1957, pp. 5029–5033.
Scondhemer et al. J.A.C.S. 80, 1958, pp. 3087–3090.

HENRY A. FRENCH, *Primary Examiner.*

U.S. Cl. X.R.

260—397.5

UNITED STATES PATENT OFFICE
CERTIFICATE OF CORRECTION

Patent No. 3,427,386          Dated February 11, 1969

Inventor(s) ALBERT BOWERS et al.

It is certified that error appears in the above-identified patent and that said Letters Patent are hereby corrected as shown below:

Column 1, that portion of the upper left formula reading

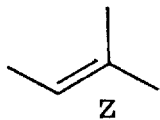 should read 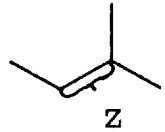

Column 6, line 11, cancel "the combination" and replace it with -- 5 to 50 mg. --. Column 6, line 15, cancel "the combination" and replace it with -- 5 to 50 mg. --. Column 6, line 32, before "$\Delta^4$", insert -- 17α-lower alkyl- --. Column 6, line 36, before "$\Delta^4$", insert -- 17α-lower alkyl- --.

SIGNED AND
SEALED
MAR 3 - 1970

(SEAL)
Attest:

Edward M. Fletcher, Jr.
Attesting Officer

WILLIAM E. SCHUYLER, JR
Commissioner of Patents